(12) United States Patent
Trivino et al.

(10) Patent No.: US 11,133,960 B2
(45) Date of Patent: Sep. 28, 2021

(54) SYSTEMS AND METHODS FOR CONFIGURING VIRTUAL NETWORKS

(71) Applicant: OVH, Roubaix (FR)

(72) Inventors: Gaetan Trivino, Lille (FR); Jeremie Denechaud, Lille (FR)

(73) Assignee: OVH, Roubaix (FR)

( * ) Notice: Subject to any disclaimer, the term of this patent is extended or adjusted under 35 U.S.C. 154(b) by 64 days.

(21) Appl. No.: 16/698,511

(22) Filed: Nov. 27, 2019

(65) Prior Publication Data

US 2020/0177415 A1    Jun. 4, 2020

(30) Foreign Application Priority Data

Nov. 29, 2018   (EP) ...................................... 18315045

(51) Int. Cl.
  *H04L 12/46*  (2006.01)
  *H04L 12/66*  (2006.01)
  *H04L 29/06*  (2006.01)

(52) U.S. Cl.
  CPC ...... *H04L 12/4679* (2013.01); *H04L 12/4633* (2013.01); *H04L 12/66* (2013.01); *H04L 63/0236* (2013.01); *H04L 63/0272* (2013.01)

(58) Field of Classification Search
  CPC ............... H04L 63/1441; H04L 63/101; H04L 12/4679; H04L 12/4633; H04L 12/66; H04L 63/0236; H04L 63/0272; H04L 63/162; H04L 63/164; H04L 12/4641; H04L 41/0803
  See application file for complete search history.

(56) References Cited

U.S. PATENT DOCUMENTS

| | | | |
|---|---|---|---|
| 10,348,767 B1* | 7/2019 | Lee ..................... | H04L 63/1441 |
| 2009/0007218 A1* | 1/2009 | Hubbard ............... | H04L 63/101 |
| | | | 726/1 |
| 2016/0212098 A1 | 7/2016 | Roch | |
| 2017/0093918 A1 | 3/2017 | Banerjee et al. | |

OTHER PUBLICATIONS

Extended European Search Report with regard to EP Patent Application No. 18315045.7 dated May 21, 2019.
HomChaudhuri et al., "Cisco Systems' Private VLANs: Scalable Security in a Multi-Client Environment", Cisco Systems, 2010, https://tools.ietf.org/html/rfc5517, accessed on Jun. 8, 2018, 12 pages.
Sajassi-Drake et al., "A Network Virtualization Overlay Solution using EVPN draft-ietf-bess-evpn-overlay-08", BESS Workgroup, Internet Draft, 2017, https://tools.ietf.org/html/draft-ietf-bess-evpn-overlay-08, accessed on Jun. 8, 2018, 29 pages.

(Continued)

*Primary Examiner* — Vinncelas Louis
(74) *Attorney, Agent, or Firm* — BCF LLP

(57) ABSTRACT

Methods and systems are described for configuring a virtual network. Endpoints of the virtual network may be configured to restrict communications between devices that communicate via the virtual network. Each endpoint may comprise a list of addresses of other endpoints on the virtual network. An endpoint may be prevented from communicating with another endpoint by removing the other endpoint's address from the list of addresses stored by the endpoint.

15 Claims, 10 Drawing Sheets

(56) References Cited

OTHER PUBLICATIONS

Jain, "VxLAN BGP-EVPN", https://www.nanog.org/sites/default/files/1_Jain_VxLAN_BGP-EVPN.pdf, accessed on Jun. 8, 2018, 25 pages.
"Learn About VXLAN in Virtualized Data Center Networks", Juniper Networks, https://www.juniper.net/documentation/en_US/learn-about/LA_VXLANinDCs.pdf, accessed on Jun. 8, 2018, 12 pages.
"Cisco Border Gateway Protocol Control Plane for Virtual Extensible LAN", Cisco, White Paper, 2015, https://www.cisco.com/c/en/us/products/collateral/switches/nexus-9000-series-switches/white-paper-c11-733737.pdf, accessed on Jun. 8, 2018, 6 pages.
"Cisco Nexus 7000 Series Switches", 2015, https://www.cisco.com/c/en/us/products/collateral/switches/nexus-7000-series-switches/white-paper-c11-735015.html, accessed on Nov. 21, 2019, 16 pages.
Buresh et al., "A Modern, Open and Scalable Fabric VXLAN EVPN", Cisco, https://www.cisco.com/c/dam/en/us/td/docs/switches/datacenter/nexus9000/sw/vxlan_evpn/VXLAN_EVPN.pdf, accessed on Jun. 8, 2018, 170 pages.
Mahalingam et al., "Virtual eXtensible Local Area Network (VXLAN): A Framework for Overlaying Virtualized Layer 2 Networks over Layer 3 Networks", 2014, https://tools.ietf.org/html/rfc7348, accessed on Jun. 8, 2018, 22 pages.

\* cited by examiner

SYSTEMS AND METHODS FOR CONFIGURING VIRTUAL NETWORKS

CROSS-REFERENCE

The present application claims priority from European Patent Application no 18315045.7 filed on Nov. 29, 2018, the disclosure of which is incorporated by reference herein.

FIELD

Embodiments described herein relate generally to systems and methods for configuring virtual networks, and more particularly, to systems and methods for isolating devices within virtual networks.

BACKGROUND

Virtual networks, such as a virtual extensible local area network (VXLAN), may be used to create a network that appears to be on a single physical network but actually can span multiple physical networks. In a data center providing services for multiple customers, each customer may have their own virtual networks. Using virtual networks may allow each customer's traffic to be virtually isolated from other customers' devices. Each virtual network may be identified by a network identifier such as a VXLAN network identifier (VNI).

When using a virtual network, devices, such as servers and/or network devices, that are part of the virtual network might not be isolated from each other. It might be possible for a device on the virtual network to communicate with the other devices on the virtual network or discover information about the other devices on the virtual network even if these devices are not intended to access each other. For security and other reasons it may be preferable to isolate all or a portion of the devices within the virtual network from each other. A network operator may wish to control the flow of traffic between devices communicating via the network. For example, a network operator may wish to reduce the amount of traffic received by an overloaded switch. It may be preferable to allow a network operator to control communications between devices.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

The following summary is for illustrative purposes only and is not intended to limit or constrain the detailed description. The following summary merely presents various described aspects in a simplified form as a prelude to the more detailed description provided below.

Virtual network technology may be used to encapsulate network packets. Each individual virtual network may be identified by a network identifier. The network identifier may be included in packets originating from and/or traveling to the virtual network.

Endpoints of the virtual network such as VXLAN tunnel endpoints (VTEPs) may receive packets and remove the encapsulation from those packets. An endpoint may be implemented in a server, switch, hypervisor, and/or any other device. An endpoint may be implemented in software and/or hardware. Each endpoint in a virtual network may comprise a list of addresses of other endpoints in the virtual network. When transmitting a packet the endpoint may transmit the packet to one of the endpoints on the list of addresses. An endpoint may be restricted from transmitting packets to endpoints that are not on the list of addresses because the endpoint might not store addresses of any endpoints other than those on the list of addresses.

Typically for a virtual network each endpoint associated with the virtual network may comprise an address for every other endpoint associated with the virtual network. The list of addresses stored on an endpoint may comprise an address for each other endpoint on the virtual network.

A virtual network may comprise devices, such as servers and/or network devices, that are not intended to communicate directly with each other or access each other. In a data center a single virtual network may comprise servers corresponding to multiple customers and/or multiple groups of users. For security reasons it may be preferable to block all communications between servers from different customers and/or different groups of users. In order to prevent servers within a virtual network from communicating with each other, or in other words in order to isolate servers within the virtual network from each other, endpoints may be restricted from communicating with certain other endpoints. In order to isolate a server within a virtual network, the list of addresses stored on an endpoint corresponding to the server may be configured to select which other endpoints the endpoint can communicate with. The isolation may occur at the data link layer of the network, which may be referred to as layer 2.

Addresses may be dynamically added to and/or removed from the list of addresses stored on an endpoint. In order to reduce traffic to a network device such as a router, the address of the endpoint corresponding to that network device may be removed from the list of addresses stored on other endpoints. The address may be removed permanently or temporarily.

In one aspect, various implementations of the present technology may provide a method comprising receiving a request to isolate a first device from a second device. The first device and the second device may correspond to a same virtual network. The method may comprise determining an address of a first endpoint corresponding to the first device. The method may comprise determining an address of a second endpoint corresponding to the second device. The method may comprise configuring the first endpoint to prevent communications with the address of the second endpoint. The method may comprise configuring the second endpoint to prevent communications with the address of the first endpoint.

In the context of the present specification, unless expressly provided otherwise, a computer system may refer, but is not limited to, an "electronic device," an "operation system," a "system," a "computer-based system," a "controller unit," a "monitoring device," a "control device," and/or any combination thereof appropriate to the relevant task at hand.

In the context of the present specification, unless expressly provided otherwise, the expression "computer-readable medium" and "memory" are intended to comprise media of any nature and kind whatsoever, non-limiting examples of which include RAM, ROM, disks (CD-ROMs, DVDs, floppy disks, hard disk drives, etc.), USB keys, flash memory cards, solid state-drives, and/or tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the expression "device" is intended to comprise servers and/or other computer systems, network devices such as switches and routers, virtual machines, and/or any other type of computing devices.

In the context of the present specification, unless expressly provided otherwise, the words "first," "second," "third," etc. have been used as adjectives only for the purpose of allowing for distinction between the nouns that they modify from one another and not for the purpose of describing any particular relationship between those nouns.

Implementations of the present technology each may have at least one of the above-mentioned object and/or aspects but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

A network virtualization technology such as VXLAN may be used to provide virtual networks. Packets transmitted between devices may be encapsulated with a network identifier such as a VNI to indicate which virtual network the packets are associated with. The virtual network may group devices together even if the devices might not be directly connected to each other. Virtual networks may be isolated from each other. Devices in one virtual network might not be able to communicate with devices in another virtual network. In a data center, different customers might be assigned different virtual networks. In this way one customer might be prevented from accessing another client's servers and/or virtual machines.

Endpoints such as VTEPs may be used to encapsulate and/or decapsulate packets transmitted on a virtual network. Each endpoint may comprise a list of addresses associated with the virtual network such as IP addresses and/or MAC addresses of other endpoints and/or devices communicating via the other endpoints. An endpoint may communicate with the devices on their list of addresses. An endpoint might not communicate with devices that are not on the list of addresses. The endpoint may retrieve the list of addresses from a database and/or configuration system. The database and/or configuration system may push the list of addresses to the endpoint.

The list of addresses may be configured to include and/or exclude certain addresses in order to prevent devices that are not intended to communicate directly with each other from communicating with each other within a virtual network. The list of addresses stored in an endpoint may comprise an address for every other endpoint associated with the virtual network of the endpoint. The list of addresses stored in an endpoint may comprise addresses for a subset of the other endpoints associated with the virtual network of the endpoint. The list of addresses may comprise addresses for gateways in the virtual network but might not comprise addresses for other servers in the virtual network.

Figure 1:
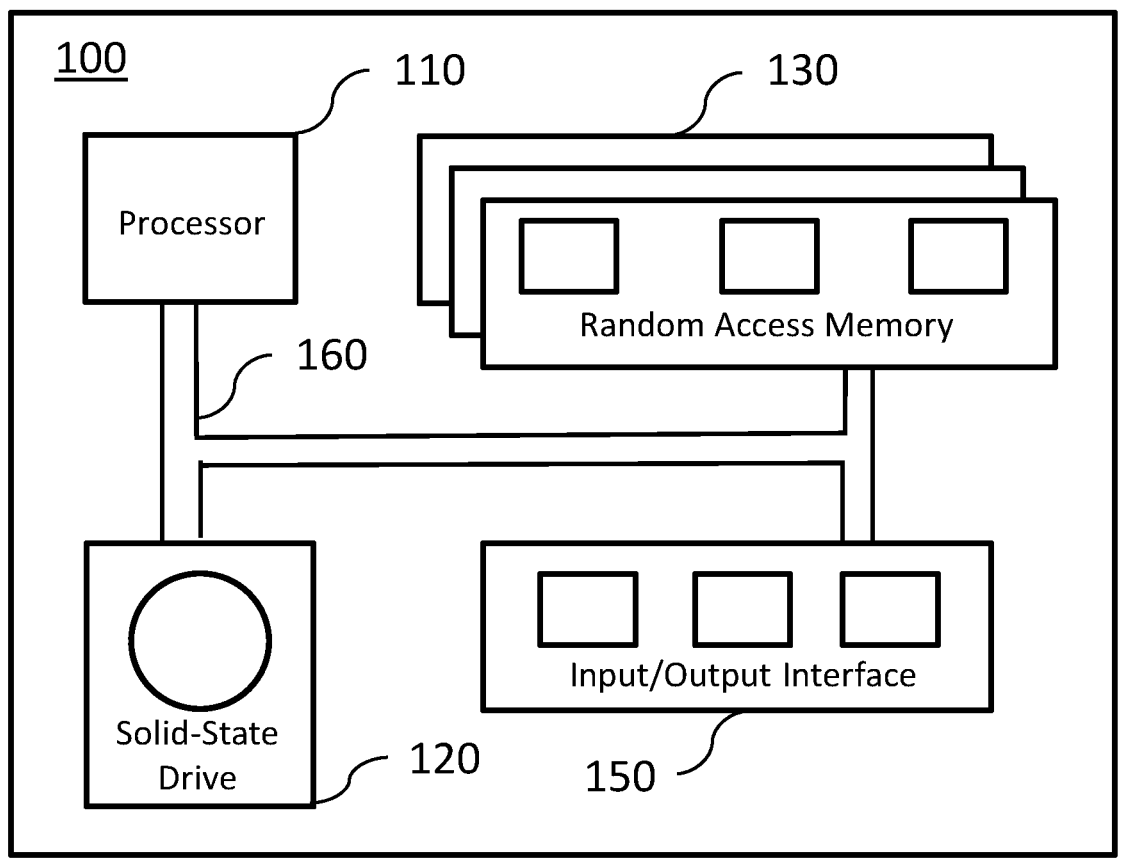
FIG. 1 shows an example computing system that may be used to implement any of the methods described herein.

FIG. 1 illustrates a diagram of a computing environment 100 in accordance with an embodiment of the present technology. In some embodiments the computing environment 100 may be implemented by any of a conventional personal computer, a server, a router, a switch, a controller, and/or an electronic device (such as, but not limited to, a mobile device, a tablet device, a server, a controller unit, a control device, a monitoring device etc.) and/or any combination thereof appropriate to the relevant task at hand. In some embodiments the computing environment 100 comprises various hardware components including one or more single or multi-core processors collectively represented by a processor 110, a solid-state drive 120, a memory device that may for example include a random access memory 130, and an input/output interface 150. The memory device may also include a non-transitory computer-readable medium. The computing environment 100 may be a computer specifically designed for operating in a data center environment. The computing environment 100 may be a generic computer system.

In some embodiments, the computing environment 100 may also be a sub-system of one of the above-listed systems. In some embodiments the computing environment 100 may be an "off the shelf" generic computer system. In some embodiments the computing environment 100 may be distributed amongst multiple systems. The computing environment 100 may be specifically dedicated to the implementation of the present technology. As a person skilled in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi, or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110. For example, the program instructions may be part of a library or an application. Although illustrated as a solid-state drive 120, any type of memory may be used in place of the solid-state drive 120, such as a hard disk, optical disk, and/or removable storage media.

Figure 2:
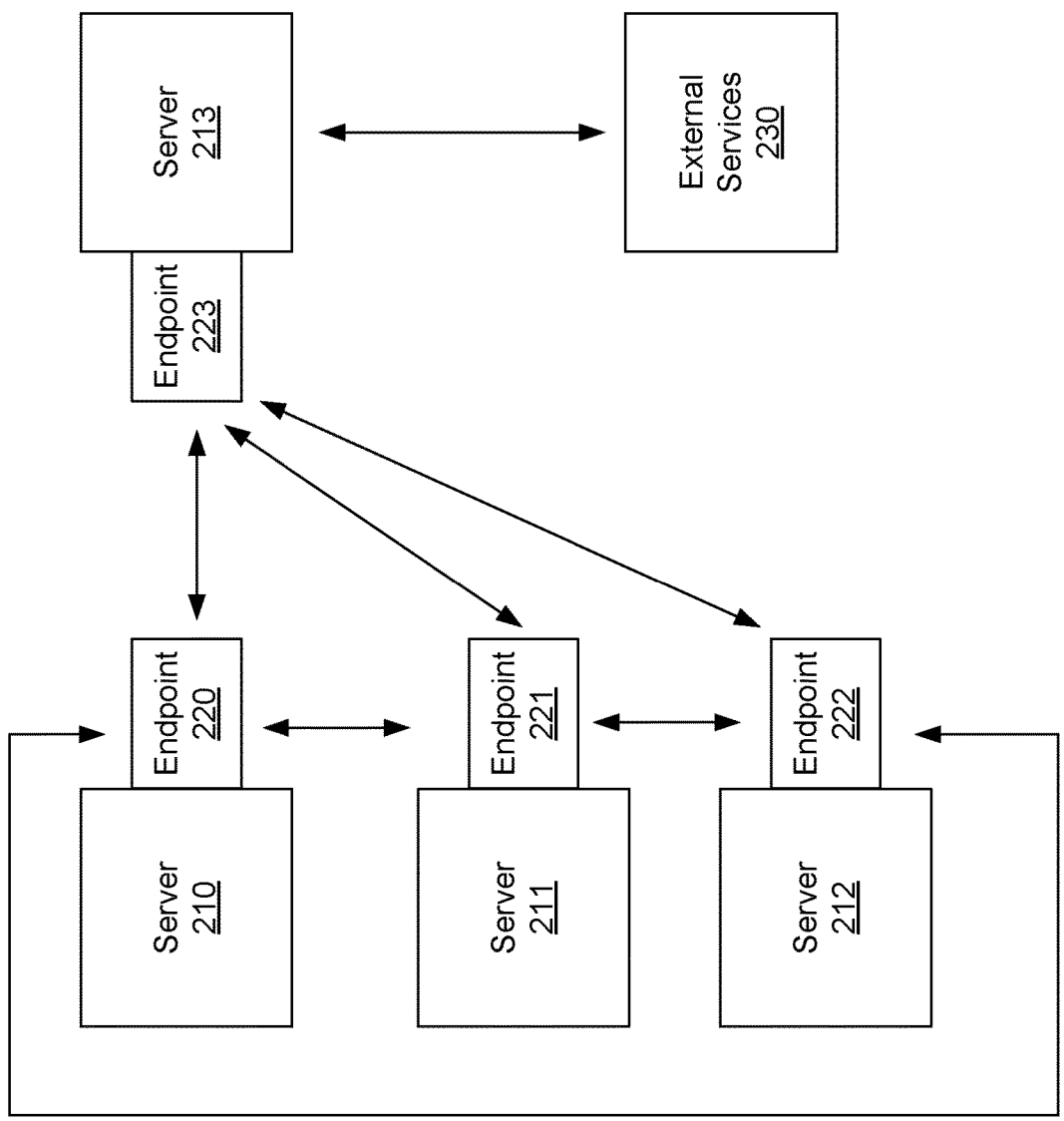
FIG. 2 shows an example of a network configuration according to one or more illustrative aspects of the disclosure.

FIG. 2 shows an example of a network configuration according to one or more illustrative aspects of the disclosure. Servers 210-13 may comprise servers participating in a virtual network which may be identified by a network identifier. The servers 210-13 may be members of a same virtual network.

The server 213 may act as a gateway which communicates with external services 230. The external services 230 may comprise the internet and/or any other services that are external to the virtual network. Although illustrated as servers 210-13 the servers 210-13 may be any devices such as switches or other network devices.

The servers 210-13 may comprise and/or be in communication with endpoints 220-23, respectively. The endpoints 220-23 may encapsulate and/or decapsulate data transmitted via the virtual network. Each endpoint 220-23 may comprise a list of addresses of other endpoints 220-23. Endpoint 220 may store a list of addresses comprising the addresses of endpoints 221-23. When the server 210 requests to transmit a packet, the endpoint 220 may determine which other endpoint 221-23 corresponds to the address of the packet. If the server 210 addresses a message to the server 212, the endpoint 220 may determine that the packets are to be transmitted to the endpoint 222. The endpoint 220 may then encapsulate the packets and forward the packets to the endpoint 222. The endpoint 222 may then decapsulate the received packets and provide the packets to the server 212.

If one of the servers 210-12 requests to communicate with external services 230, the server 210-12 may transmit and/or receive communications via the server 213 which may act as a gateway. If a device external to the virtual network requests to communicate with one of the servers 210-12 the server 213 may receive the communication from the external device and forward the communication to the requested server 210-12.

When the server 210 performs a scan of the network, the server 210 may receive information regarding the servers 211-13. In the exemplary networking configuration illustrated in FIG. 2 each of the servers 210-13 may be configured to communicate with each of the other servers 210-13. Each endpoint 220-23 may comprise addresses of each of the other endpoints 220-23. For example, server 211 may be able to communicate with any of servers 210, 212, and 213. It may be desirable to prevent communications between the servers 210, 211, and/or 212. The servers 210, 211, and/or 212 may each be managed by different customers. Although a network operator may wish to isolate the servers 210, 211, and/or 212 from each other, the operator may wish for the servers 210, 211, and/or 212 to share network infrastructure, such as the server 213 acting as a gateway. As described in further detail below, the endpoints 220-22 may be configured to prevent communications between the servers 210-12.

Figure 3:
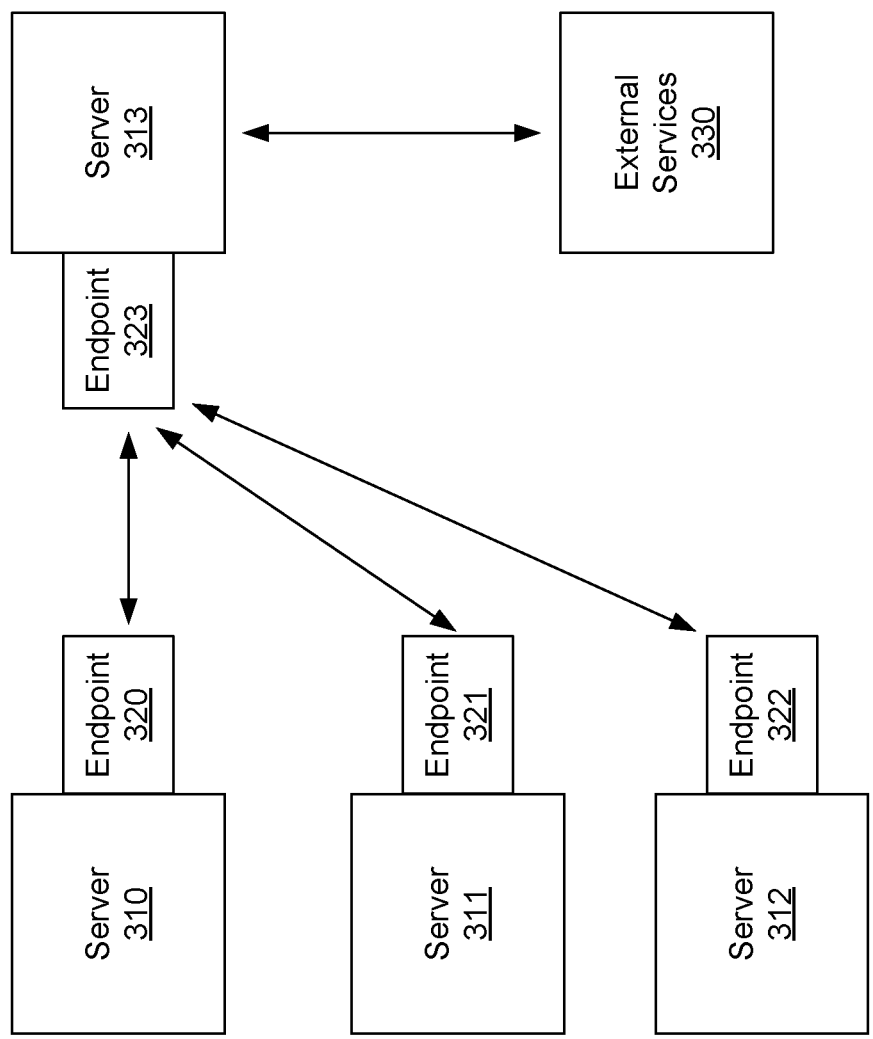
FIG. 3 shows an example of a network configuration with restricted communications according to one or more illustrative aspects of the disclosure.

FIG. 3 shows an example of a network configuration with restricted communications according to one or more illustrative aspects of the disclosure. Servers 310-13 may be members of a same virtual network. In the exemplary network configuration illustrated in FIG. 3 the servers 310-12 may be prevented from communicating with each other. Unlike in FIG. 2 in which the endpoints 220-22 were aware of each other, the endpoints 320-22 might not be aware of each other. The list of addresses stored by the endpoint 320 might not include the addresses of endpoints 321 and 322.

If server 310 were to request to communicate with server 311, the endpoint 320 may search its stored list of addresses for an address for an endpoint corresponding to the server 311. The endpoint 320 might not find the address of endpoint 321 in the list of addresses and thereby might not be able to communicate directly with the endpoint 321 and/or the server 311. When the server 310 performs a scan of the network the server 310 may receive information regarding the server 313 but might not receive information regarding the servers 311-12. Each of the servers 310-12 may be able to communicate with server 313 and may be able to access the external services 330 via the server 313.

By configuring the endpoints 320-22 to be unaware of each other, the servers 310-12 may belong to a same virtual network but be isolated from each other. The servers 310-12 may be isolated from each other at the data link layer of a physical network, i.e. layer 2. Each of the servers 310-12 may be able to access shared infrastructure of the virtual network such as the server 313 which may act as a gateway. The virtual network may comprise servers that correspond to different customers. The virtual network may comprise a maintenance network which is used by network administrators to perform maintenance on the servers in the virtual network. By configuring the endpoints 320-22, servers 310-12 may communicate via a same virtual network but may be isolated from each other. This may be particularly desirable if the servers 310-12 correspond to different customers.

Figure 4:
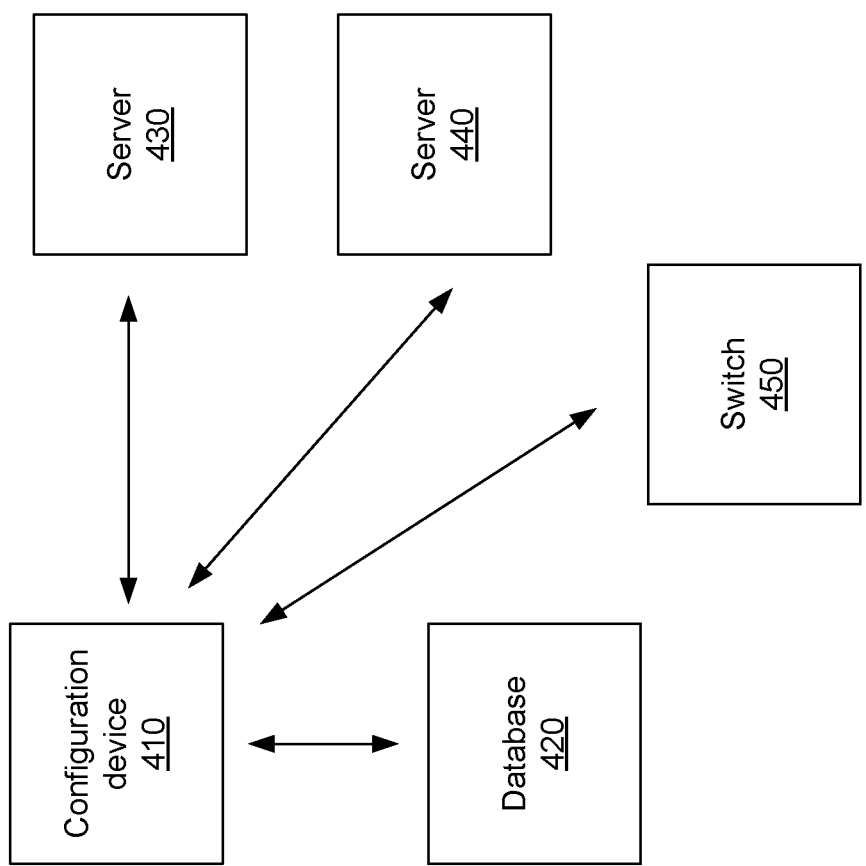
FIG. 4 shows an example of a system for configuring devices according to one or more illustrative aspects of the disclosure.

FIG. 4 shows an example of a system for configuring devices according to one or more illustrative aspects of the disclosure. The configuration device 410 may be used to configure devices on a network. The configuration device 410 may configure devices to operate within a virtual network. The configuration device 410 may retrieve information regarding the network from a database 420. The database 420 may comprise profiles for each of the devices on the network. Each profile may indicate an address of the device, a physical location of the device, virtual networks corresponding to the device, a type of the device, information describing the hardware of the device, and/or any other information regarding the device.

The database 420 may store information regarding each of the servers 430 and 440, and/or the switch 450. The configuration device 410 may query the database 420 to determine the configurations to be applied to the servers 430 and 440 and/or to the switch 450. Although described as a database 420, any type of storage may be used. After applying a configuration to the servers 430 and 440 and/or to the switch 450, the servers 430 and 440 may communicate via a virtual network. The configuration device 410 may re-configure the server 430, server 440, and/or switch 450 at any time. Each time a device is added and/or removed from the virtual network, the configuration device 410 may reconfigure the server 430, server 440, and/or switch 450. Method 500, described below and in FIG. 5, is a method that may be executed by the configuration device 410 to configure the server 430, server 440, and/or switch 450.

Figure 5:
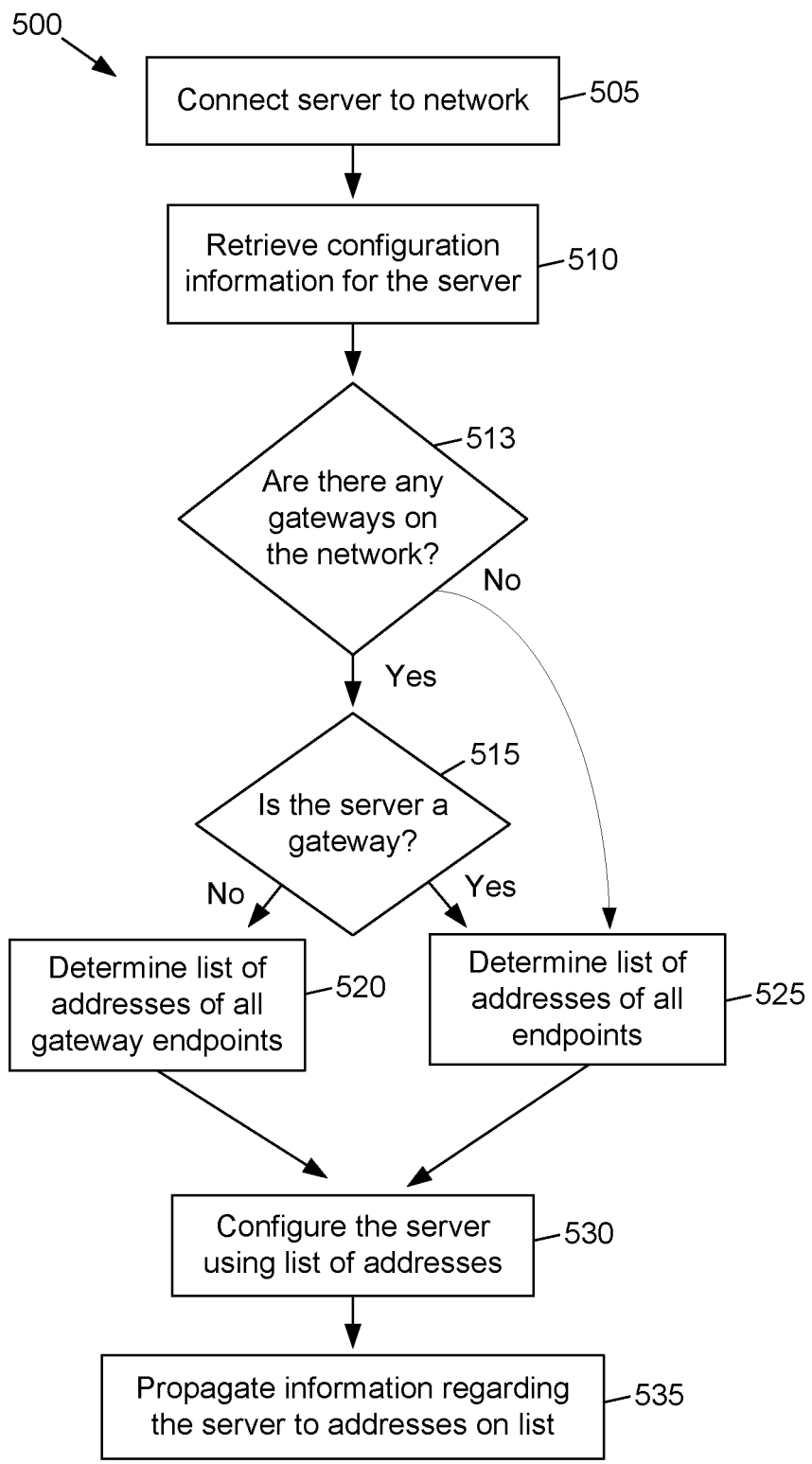
FIG. 5 is a flow diagram of a method for configuring a server according to one or more illustrative aspects of the disclosure.

FIG. 5 is a flow diagram of a method for configuring a server according to one or more illustrative aspects of the disclosure. In one or more embodiments the method 500 or one or more steps thereof may be performed by one or more computing devices or entities. Without limitation, all or portions of the method 500 may be executed by the configuration device 410, database 420, servers 430-40, and/or switch 450. All or portions of the method 500 may be performed by components of the computing device 100. The method 500 or one or more steps thereof may be embodied in computer-executable instructions that are stored in a computer-readable medium, such as the non-transitory computer-readable medium of the memory device. Some steps or portions of steps in the flow diagram may be omitted or changed in order.

At step 505 a server may be connected to the network. Other events in addition to or instead of the server being connected to the network may trigger the method 500 at step 505. The server may have previously been connected to the network and at step 505 be activated. An instruction to configure the server may be received at step 505. An instruction to configure the server to participate in a virtual network may be received at step 505. A change may be detected in a virtual network corresponding to the server. After the change is detected the server may be reconfigured.

Although described as a server at step 505, any device that participates in a virtual network may be configured using the method 500. A switch, router, gateway, or any other network device may be configured.

At step 510 configuration information for the server may be retrieved. The configuration information may be retrieved from a database, such as the database 420. A configuration device such as the configuration device 410 may query the database to retrieve configuration information for configuring the server. The database may comprise information regarding a network on which the server communicates. The database may comprise information regarding virtual networks. The database may comprise information regarding devices associated with a virtual network. The database may comprise the addresses of devices associated with a virtual network. The database may be queried to retrieve configuration information regarding the server.

At step 513 a determination may be made as to whether there are any gateways on the virtual network. A database such as the database 420 may be queried to determine whether there are any gateways on the virtual network. The configuration information may indicate whether there are any gateways on the virtual network. If there are no gateways on the virtual network, at step 525 a list of addresses corresponding to all other endpoints of the virtual network may be determined. If there are no specified gateways on the virtual network, every device on the virtual network may be configured as a gateway. If there are one or more gateways on the virtual network, a determination may be made at step 515 as to whether the server is a gateway.

At step 515 a determination may be made as to whether the server is a gateway. The configuration information may indicate whether the server is a gateway and/or whether the server should be configured as a gateway. The database may be queried to determine whether the server is a gateway. A gateway may be a device that transfers data between networks. The gateway may receive data from the virtual network and transmit the data on a different virtual or physical network and/or vice versa. The database may indicate whether the server should be configured to communicate with all other endpoints on the virtual network or only a portion of the other endpoints on the virtual network.

If the server is a gateway, at step 525 a list of addresses corresponding to all other endpoints of the virtual network may be determined. The list of addresses may comprise addresses corresponding to both servers acting as gateways and servers that are not acting as gateways. If the server is not a gateway, at step 520 a list of addresses of the endpoints of gateways of the virtual network may be determined. The list of addresses might not comprise endpoints of devices that are not gateways.

At step 520 or 525 a database such as the database 420 may be queried to determine the addresses of the other endpoints. The addresses may comprise IP addresses, MAC addresses, and/or any other type of address that may be used to communicate with the other endpoints. The database may be queried at step 525 to determine the addresses of all other endpoints of the virtual network or the database may be queried at step 520 to determine the addresses of the gateway endpoints of the virtual network.

At step 530 the server may be configured using the list of addresses determined at step 520 or 525. An endpoint corresponding to the server may be configured to communicate on the virtual network. The endpoint may be configured to communicate with the endpoints in the list of addresses determined at step 520 or step 525. If the server is a gateway, at step 530 the endpoint of the server may be configured to communicate with all other devices on the virtual network. If the server is not a gateway, at step 530 the endpoint of the server may be configured to communicate with gateways on the virtual network. If the server is not a gateway the server may be isolated from other servers on the virtual network. The server may be isolated at the data link layer, i.e. layer 2, of the physical network on which the server communicates.

At step 535 information regarding the server may be propagated to the addresses on the list. If the server is a gateway, at step 535 information regarding the server may be transmitted to all other devices on the virtual network. If the server is not a gateway, at step 535 information regarding the server may be transmitted to gateways on the virtual network. The information may comprise an address of the server, an address of an endpoint of the server, and/or any other information regarding the server.

Figure 6:
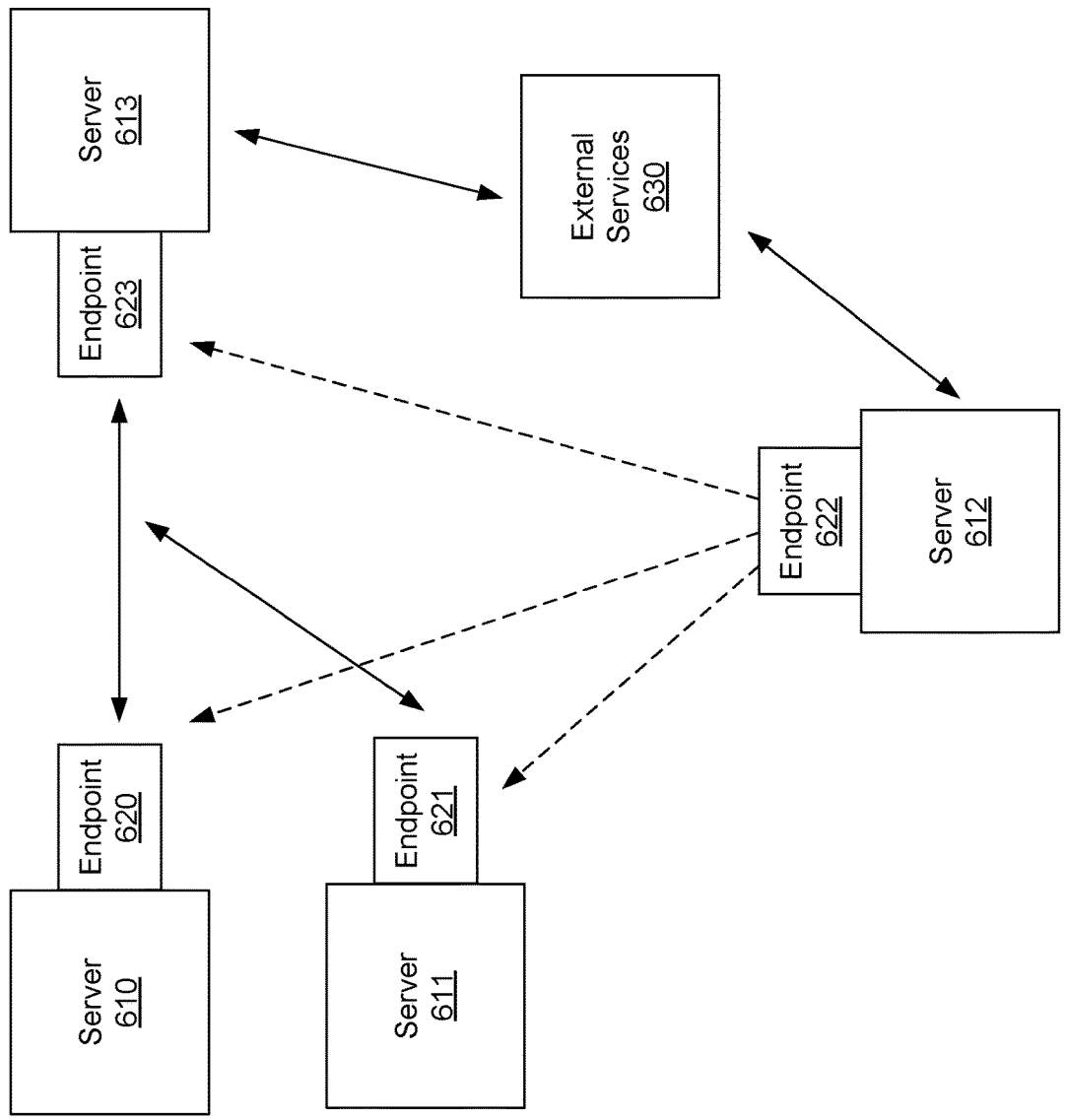
FIG. 6 shows an example of a network configuration with a test server according to one or more illustrative aspects of the disclosure.

FIG. 6 shows an example of a network configuration with a test server according to one or more illustrative aspects of the disclosure. In the exemplary network illustrated in FIG. 6 servers 610-13 are connected via a virtual network. The servers 610-13 communicate via their respective endpoints 620-23. Servers 612 and 613 may act as gateways which are able to communicate with external services 630.

Servers 610 and 611 may be isolated from each other such as using the methods described above. Endpoint 620 may be configured with a list of endpoint addresses that does not comprise the address of endpoint 621. Similarly, endpoint 621 might not store the address of endpoint 620.

The server 612 may be a device in the virtual network that is being configured and/or tested. The server 612 may be connected to the virtual network for debugging and/or other purposes. Because the server 612 is currently being tested and may be unstable, it might be preferable to prevent the server 612 from processing communications. The server 612 may be configured as a gateway but might not yet be trusted to perform gateway functions for the virtual network. Until the server 612 has completed the testing, traffic may be routed to the server 613 instead of the server 612.

In order to prevent incoming traffic from being sent to the server 612, endpoints 620, 621, and/or 623 may be configured to prevent transmissions to the server 612. The endpoints 620, 621, and/or 623 might not comprise the address of the endpoint 622 in their respective lists of addresses. In this way the endpoints 620, 621, and/or 623 may be prevented from transmitting packets to the endpoint 622.

In order to perform testing of the server 612, the server 612 may communicate with the servers 610, 611, and/or 613. The endpoint 622 of the server 612 may be configured to store the addresses of the endpoints 620, 621, and 623. Thus, even though the endpoints 620, 621, and 623 might not be able to transmit data to the endpoint 622, the endpoint 622 may be able to transmit data to the endpoints 620, 621, and/or 623. This may allow the server 612 and/or endpoint 622 to perform various tests within the virtual network, without damaging the stability of the virtual network.

Figure 7:
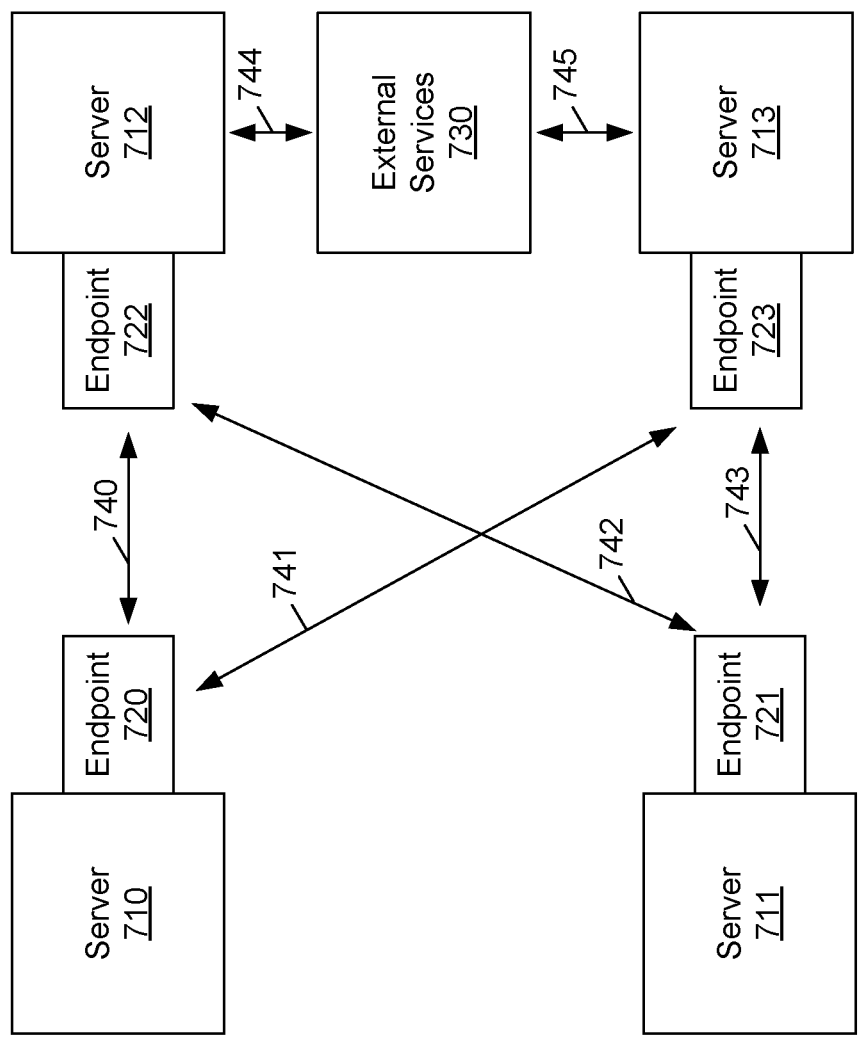
FIG. 7 shows an example of a network configuration with load balancing according to one or more illustrative aspects of the disclosure.

FIG. 7 shows an example of a network configuration with load balancing according to one or more illustrative aspects of the disclosure. A network operator may wish to balance the load of various devices within a virtual network. If the network has multiple gateways, network efficiency may be increased by balancing the load between the multiple gateways. Load balancing in a virtual network may be performed by creating and destroying links between devices.

Servers 710-13 may comprise servers within a virtual network. The servers 712 and 713 may act as gateways and may communicate with external services 730 via the links 744 and 745. Servers 710 and 711 may use endpoints 720 and 721 to communicate with endpoints 722 and 723 of servers 712 and 713. Using the methods described above the servers 710 and 711 may be prevented from communicating directly with each other.

A network operator may wish to balance the load between servers 712 and 713. In order to balance the load, links 740-43 may be adjusted. If server 712 is overloaded, links 742 and 740 may be destroyed, or in other words deactivated, in which case all gateway traffic may flow to the server 713. If server 713 is overloaded, links 743 and 741 may be destroyed in which case all gateway traffic may flow to server 712.

The links 740-43 may be dynamically adjusted based on network load, processor usage, memory usage, response time, and/or any other performance metric. The links 740-43 may be dynamically adjusted based on scheduled downtime or other maintenance. For example if maintenance is being performed on server 713 then links 745, 741, and/or 743 may be temporarily destroyed until the maintenance is completed.

The links 740-43 may be destroyed in which case the endpoints at either end of the link may be adjusted to destroy the link. To destroy the link 742, the address of endpoint 722 may be removed from the list of addresses on endpoint 721 and the address of endpoint 721 may be removed from the list of addresses on endpoint 722. Thus, the endpoint 722 might not be able to communicate with the endpoint 721 and the endpoint 721 might not be able to communicate with the endpoint 722. Alternatively the links may be turned into one-way links in which only one endpoint can transmit data to the other endpoint. To turn the link 741 into a one-way link the address of endpoint 723 may be removed from the list of addresses on endpoint 720.

The configuration device 410 may dynamically adjust the configuration of a virtual network by creating and/or destroying links between devices on the virtual network. The configuration device 410 may receive an indication of network activity corresponding to the virtual network and may adjust the configuration of the virtual network based on the indication.

The configuration device 410 may manage the load balancing process without the servers 710-13 being configured for load balancing. The servers 710-13 might not execute load balancing software. The configuration device 410 may perform the load balancing by creating and destroying the links 740-43. The load balancing may be performed regardless of whether there is layer 2 connectivity between the servers 710-13. In the example illustrated in FIG. 7, the load balancing is performed without layer 2 connectivity between servers 710 and 711, and without layer 2 connectivity between servers 712 and 713.

Figure 8:
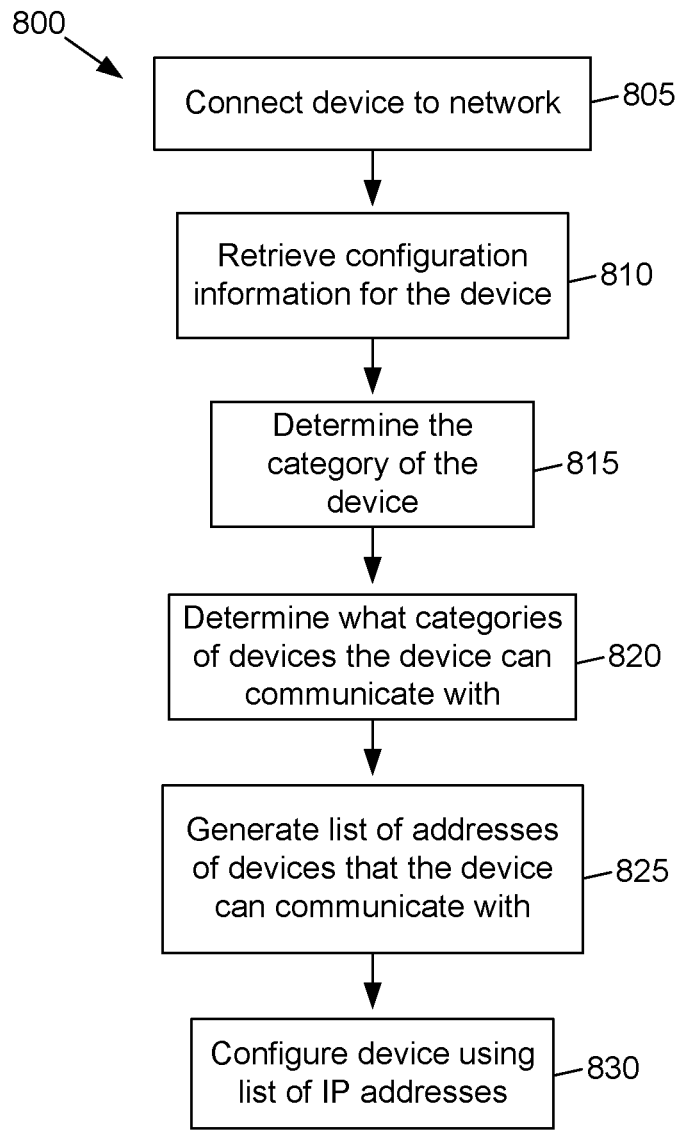
FIG. 8 is a flow diagram of a method for configuring a device based on device category according to one or more illustrative aspects of the disclosure.

FIG. 8 is a flow diagram of a method 800 for configuring a device based on device category according to one or more illustrative aspects of the disclosure. Servers and/or other devices may play various roles in a network and may be assigned a category. The category of a device may determine which other types of devices the device will be configured to communicate with. For example if a device is a gateway, the gateway may be configured to communicate with all other categories of devices on a virtual network. In another example if a device is a storage device, the storage device may be configured to communicate with categories of devices that access the storage device and might not be configured to communicate with categories of devices that do not access the storage device. This may enhance the security and/or stability of the storage by preventing accesses from unauthorized devices.

In one or more embodiments the method 800 or one or more steps thereof may be performed by one or more computing devices or entities. Without limitation, all or portions of the method 800 may be executed by the configuration device 410, database 420, servers 430-40, and/or switch 450. All or portions of the method 800 may be performed by components of the computing device 100. The method 800 or one or more steps thereof may be embodied in computer-executable instructions that are stored in a computer-readable medium such as the non-transitory computer-readable medium of the memory device. Some steps or portions of steps in the flow diagram may be omitted or changed in order.

At step 805 the device may be connected to a network. Actions performed at step 805 may be similar to those described above in regards to step 505. The device may comprise a server, switch, router, storage device, or any other device.

At step 810 configuration information for the device may be retrieved. Actions performed at step 810 may be similar to those described above in regards to step 510. At step 815 a category of the device may be determined. The configuration may indicate the category of the device. The categories of devices may be pre-defined such as by a user. Exemplary categories of devices include switches, routers, internal gateways, external gateways, storage servers, web servers, and/or application servers. These categories of devices are exemplary and any categories of devices may be defined and used.

At step 820 the categories of other devices that the device can communicate with may be determined. The rules for each device category may be pre-defined such as by a user. At step 825 a list of addresses that the device can communicate with may be generated. For example the rules may indicate that an application server may communicate with internal gateways, external gateways, and storage servers. In this example if the device were determined to be an application server at step 815, then for each internal gateway, external gateway and storage server in the virtual network an address of an endpoint corresponding to the device may be determined and stored in the list. The rules may indicate whether the communication links between devices are one-way or two-way links and the list of addresses may be generated accordingly.

At step 830 an endpoint of the device may be configured using the list of addresses. Actions performed at step 830 may be similar to those described above in regards to step 530.

Figure 9:
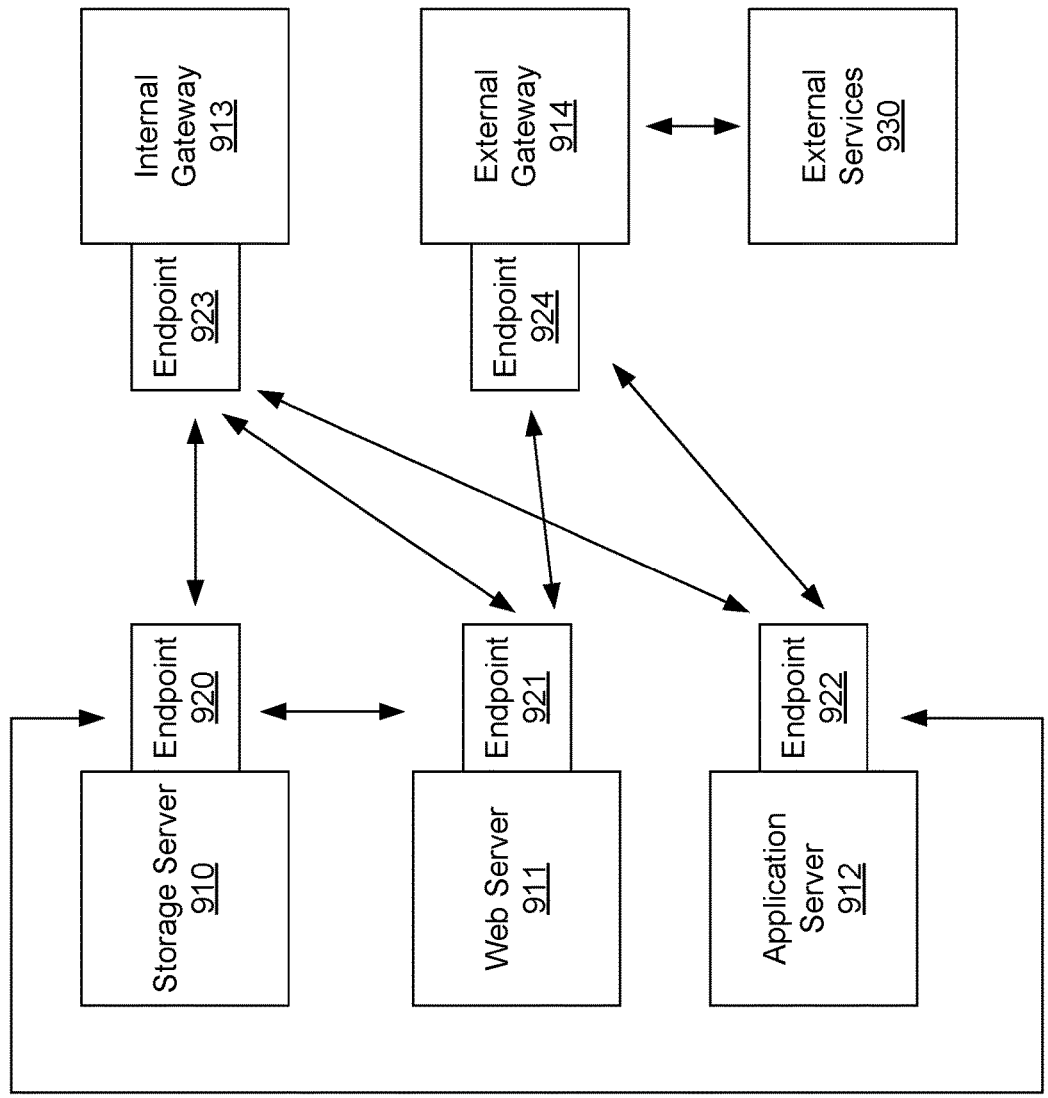
FIG. 9 shows an example of a network configuration with multiple device categories according to one or more illustrative aspects of the disclosure.

FIG. 9 shows an example of a network configuration with multiple device categories according to one or more illustrative aspects of the disclosure. Storage server 910, web server 911, application server 912, internal gateway 913, and external gateway 914 may communicate via a virtual network. Each of the devices 910-14 may be configured based on the category of that device. The configuration shown in FIG. 9 is exemplary, any categories and rules may be used for configuring communications between devices.

The rules applied to the exemplary network illustrated in FIG. 9 may indicate that the storage server 910 may be configured to communicate with the application server 912 and the web server 921. Accordingly, the endpoint 920 of the storage server 910 may be configured to communicate with the endpoint 921 of the web server 911 and the endpoint 922 of the application server 912. As described above, the endpoint 920 may comprise a list of addresses where the list of addresses may comprise an address for the endpoints 921 and 922. The rules may indicate that the storage server 910 is not to communicate with the internal gateway 913 and the external gateway 914. Thus the list of addresses stored by the endpoint 920 might not comprise an address for the endpoints 923 and 924 of the gateways 913 and 914.

The web server 911 may be configured to communicate with the storage server 910, the internal gateway 913, and the external gateway 914. Accordingly the endpoint 921 of the web server 911 may comprise addresses for the endpoints 920, 923, and 924. The application server 912 may be configured to communicate with the storage server 910, the internal gateway 913, and the external gateway 914. Accordingly the list of addresses of the endpoint 922 may comprise addresses for the endpoints 920, 923, and 924.

The rules may indicate that the internal gateway 913 may communicate with the storage server 910, the web server 911, and the application server 912. The rules may indicate that the internal gateway 913 might not be permitted to communicate with the external gateway 914. Accordingly, the endpoint 923 may store a list of addresses comprising addresses for the endpoints 920, 921, and 922. The list of addresses stored by the endpoint 923 might not comprise the address of the endpoint 924 corresponding to the external gateway 914.

The rules may indicate that the external gateway 914 is permitted to communicate with the web server 911 and the application server 912. Accordingly the endpoint 924 may store a list of addresses comprising addresses for the endpoints 921 and 922. The external gateway 914 may communicate with external services 930. The external services 930 might not be in the virtual network, so the external gateway 914 may communicate with the external services 930 directly rather than through the endpoint 924. Alternatively the external gateway 914 may communicate with the external services 930 via the endpoint 924.

Figure 10:
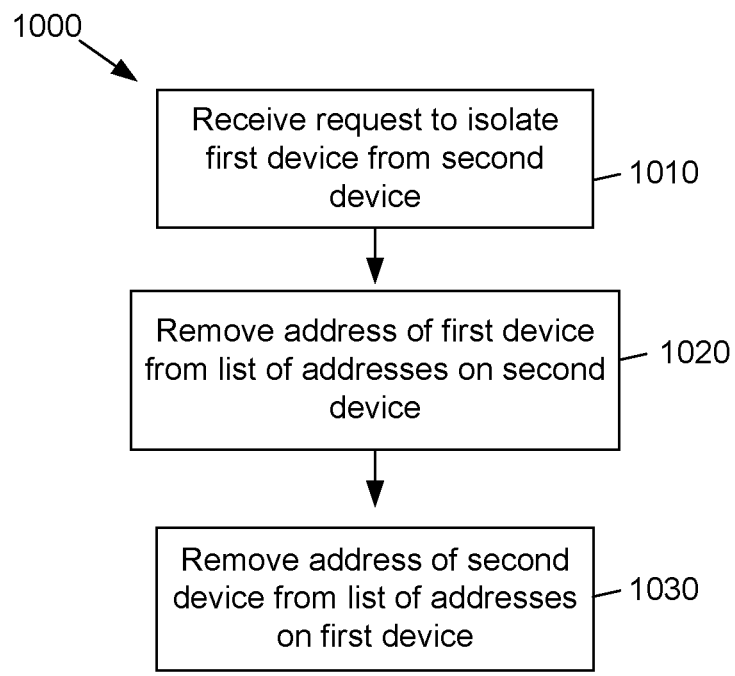
FIG. 10 is a flow diagram of a method for isolating devices according to one or more illustrative aspects of the disclosure.

FIG. 10 is a flow diagram of a method 1000 for isolating devices according to one or more illustrative aspects of the disclosure. In one or more embodiments the method 1000 or one or more steps thereof may be performed by one or more computing devices or entities. Without limitation, all or portions of the method 1000 may be executed by the configuration device 410, database 420, servers 430-40, and/or switch 450. All or portions of the method 1000 may be performed by components of the computing device 100. The method 1000 or one or more steps thereof may be embodied in computer-executable instructions that are stored in a computer-readable medium such as a non-transitory computer-readable medium. Some steps or portions of steps in the flow diagram may be omitted or changed in order.

At step 1010 a request may be received to isolate a first device from a second device. The first device and second device may communicate via a same virtual network. The first device and second device may each operate and/or be associated with endpoints. The devices may use the endpoints to communicate via the virtual network. The request may comprise a request to prevent the first device from communicating with the second device and/or a request to prevent the second device from communicating with the first device.

At step 1020 an address of the first device may be removed from a list of addresses on the second device. Step 1020 may be performed if the request comprises a request to prevent the second device from communicating with the first device. The address that is removed may comprise an address of the endpoint associated with the first device. To remove the address a replacement list of addresses may be transmitted to the second device and/or to the endpoint of the second device.

At step 1030 an address of the second device may be removed from a list of addresses on the first device. Step 1030 may be performed if the request comprises a request to prevent the first device from communicating with the second device. Actions performed at step 1030 may be similar to those described above in regards to step 1020.

After removing the addresses at step 1020 or 1030, the first device and the second device may be isolated from each other. The isolation may occur at the data link layer of the physical network associated with each of the devices, i.e. layer 2. The first device and the second device may be prevented from communicating with each other directly.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for operating network devices, the method comprising:
    storing, in a first endpoint of a first device, a first list of addresses containing addresses of endpoints of devices associated with a virtual network with which the first endpoint is authorized to communicate;
    receiving, at the first device, a request to isolate the first device from a second device, wherein the first device and the second device communicate via the virtual network;
    determining, at the first device, a second address of a second endpoint corresponding to the second device based on the stored first list of addresses;
    configuring the first endpoint to prevent communications with the second address of the second endpoint by removing the second address of the second endpoint from the first list of addresses stored in the first endpoint.

2. The method of claim 1, further comprising:
    storing, in the second endpoint of the second device, a second list of addresses containing addresses of endpoints of devices associated with the virtual network with which the second endpoint is authorized to communicate;
    receiving, at the second device, a request to isolate the second device from the first device;
    determining, at the second device, a first address of the first endpoint corresponding to the first device based on the stored second list of addresses; and
    configuring the second endpoint to prevent communications with the first address of the first endpoint by removing the first address of the first endpoint from the second list of addresses stored in the second endpoint.

3. The method of claim 1, wherein configuring the first endpoint comprises generating a list of addresses of other endpoints associated with the virtual network.

4. The method of claim 3, further comprising transmitting, to the first device, the list of addresses.

5. The method of claim 3, wherein the first endpoint is configured to communicate with the addresses of the endpoints of the devices on the first list of addresses.

6. The method of claim 3, wherein the first list of addresses excludes the second address of the second endpoint.

7. The method of claim 2, further comprising:
    configuring the first endpoint to communicate with a gateway; and
    configuring the second endpoint to communicate with the gateway.

8. The method of claim 7, further comprising:
    causing the first endpoint to store a third address of a third endpoint corresponding to the gateway; and
    causing the second endpoint to store the third address of the third endpoint.

9. The method of claim 2, further comprising:
    querying a database for the first address of the first endpoint; and
    querying the database for the second address of the second endpoint.

10. The method of claim 2, further comprising:
    determining whether a third endpoint associated with the virtual network is configured as a gateway;
    after determining that the third endpoint is configured as a gateway, configuring the first endpoint and the second endpoint to communicate with the third endpoint.

11. The method of claim 10, further comprising:
    transmitting, to the first endpoint, a third address of the third endpoint; and
    transmitting, to the second endpoint, the third address of the third endpoint.

12. An apparatus comprising:
    at least one processor; and
    a memory device comprising a non-transitory computer-readable medium storing executable instructions, which, when executed by the at least one processor, cause the apparatus to perform the method of claim 2.

13. The method of claim 1, wherein the first and second devices are associated with different groups of users.

14. The method of claim 1, wherein the virtual network comprises a network used for performing maintenance on the first device and the second device.

15. An apparatus comprising:
    at least one processor; and
    a memory device comprising a non-transitory computer-readable medium storing executable instructions, which, when executed by the at least one processor, cause the apparatus to perform the method of claim 1.

* * * * *